(12) United States Patent
Frost et al.

(10) Patent No.: US 8,171,127 B2
(45) Date of Patent: May 1, 2012

(54) SYSTEMS AND METHODS FOR RESPONSE MONITORING

(75) Inventors: Simon Frost, Bucks (GB); William Charnell, Bucks (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 1176 days.

(21) Appl. No.: 11/258,611

(22) Filed: Oct. 25, 2005

(65) Prior Publication Data

US 2007/0083647 A1   Apr. 12, 2007

Related U.S. Application Data

(60) Provisional application No. 60/725,066, filed on Oct. 7, 2005.

(51) Int. Cl.
*G06F 15/173* (2006.01)

(52) U.S. Cl. ............... 709/224; 702/1; 370/252

(58) Field of Classification Search .......... 709/224; 702/1; 370/252
See application file for complete search history.

(56) References Cited

U.S. PATENT DOCUMENTS

| | | | |
|---|---|---|---|
| 5,867,494 A | 2/1999 | Krishnaswamy et al. | |
| 5,999,525 A | 12/1999 | Krishnaswamy et al. | |
| 6,141,699 A * | 10/2000 | Luzzi et al. | 719/331 |
| 6,259,705 B1 | 7/2001 | Takahashi et al. | |
| 6,335,927 B1 | 1/2002 | Elliott et al. | |
| 6,427,132 B1 | 7/2002 | Bowman-Amuah | |
| 6,427,168 B1 * | 7/2002 | McCollum | 709/224 |
| 6,446,028 B1 * | 9/2002 | Wang | 702/186 |
| 6,484,143 B1 | 11/2002 | Swildens et al. | |
| 6,502,131 B1 | 12/2002 | Vaid et al. | |
| 6,523,027 B1 | 2/2003 | Underwood | |
| 6,526,371 B1 * | 2/2003 | Klein et al. | 702/186 |
| 6,587,878 B1 * | 7/2003 | Merriam | 709/224 |
| 6,601,233 B1 | 7/2003 | Underwood | |
| 6,609,128 B1 | 8/2003 | Underwood | |
| 6,633,878 B1 | 10/2003 | Underwood | |
| 6,636,242 B2 | 10/2003 | Bowman-Amuah | |
| 6,704,873 B1 | 3/2004 | Underwood | |
| 6,718,535 B1 | 4/2004 | Underwood | |
| 6,731,625 B1 | 5/2004 | Eastep et al. | |

(Continued)

FOREIGN PATENT DOCUMENTS

WO    0013373    3/2000

(Continued)

OTHER PUBLICATIONS

International Search Report, PCT/US2006/039309, mailed on Oct. 18, 2007.

(Continued)

*Primary Examiner* — Jude J Jean-Gilles
*Assistant Examiner* — Jaren M Means
(74) *Attorney, Agent, or Firm* — Foley and Lardner LLP; John D. Lanza (57) ABSTRACT

Systems and methods for response monitoring are described. A method of generating a measurement for use in calculating an end-user experience metric in a server-based computing environment includes, transmitting a message from a client of the server-based computing environment to an application executing in a user space provided by an operating system of the server, receiving a graphic response for execution by the client from the application, and determining an amount of time elapsed between the transmission of the message and the conclusion of the execution of the graphic response.

72 Claims, 7 Drawing Sheets

U.S. PATENT DOCUMENTS

| | | |
|---|---|---|
| 6,754,181 B1 | 6/2004 | Elliott et al. |
| 6,754,699 B2 | 6/2004 | Swildens et al. |
| 6,763,383 B1 * | 7/2004 | Evison et al. ............... 709/224 |
| 6,820,133 B1 | 11/2004 | Grove et al. |
| 6,909,708 B1 | 6/2005 | Krishnaswamy et al. |
| 6,917,971 B1 * | 7/2005 | Klein ............... 709/224 |
| 7,028,083 B2 | 4/2006 | Levine et al. |
| 7,034,691 B1 | 4/2006 | Rapaport et al. |
| 7,064,681 B2 | 6/2006 | Horstemeyer |
| 7,100,195 B1 | 8/2006 | Underwood |
| 7,107,285 B2 | 9/2006 | von Kaenel et al. |
| 7,113,110 B2 | 9/2006 | Horstemeyer |
| 7,119,716 B2 | 10/2006 | Horstemeyer |
| 7,145,898 B1 | 12/2006 | Elliott |
| 7,206,805 B1 | 4/2007 | McLaughlin, Jr. |
| 7,385,924 B1 | 6/2008 | Riddle |
| 7,451,221 B2 | 11/2008 | Basani et al. |
| 2002/0059622 A1 | 5/2002 | Grove et al. |
| 2002/0105942 A1 | 8/2002 | Ahmadi et al. |
| 2002/0116491 A1 | 8/2002 | Boyd et al. |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0199016 A1 | 12/2002 | Freedman |
| 2003/0055883 A1 * | 3/2003 | Wiles, Jr. ............... 709/203 |
| 2003/0065763 A1 | 4/2003 | Swildens et al. |
| 2003/0105604 A1 | 6/2003 | Ash et al. |
| 2003/0161341 A1 * | 8/2003 | Wu et al. ............... 370/448 |
| 2004/0043770 A1 | 3/2004 | Amit et al. |
| 2004/0073512 A1 | 4/2004 | Maung |
| 2005/0033858 A1 | 2/2005 | Swildens et al. |
| 2005/0257258 A1 | 11/2005 | Kinoshita et al. |
| 2006/0002370 A1 | 1/2006 | Rabie et al. |
| 2007/0179955 A1 | 8/2007 | Croft et al. |
| 2008/0049786 A1 | 2/2008 | Ram et al. |
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |

FOREIGN PATENT DOCUMENTS

| | | |
|---|---|---|
| WO | WO-02/103521 | 12/2002 |
| WO | WO-2008112698 A2 | 9/2008 |

OTHER PUBLICATIONS

Written Opinion of the International Searching Authority, PCT/US2006/039309, mailed on Oct. 18, 2007.

* cited by examiner

SYSTEMS AND METHODS FOR RESPONSE MONITORING

FIELD OF THE INVENTION

The invention relates to monitoring response time in a server based computing environment. More specifically, the invention relates to generating a measurement for use in calculating an end-user experience metric in a server-based computing environment

BACKGROUND OF THE INVENTION

Measuring the true end-user interaction experience with applications operating within a Server Based Computing (SBC) (also referred to a distributed computing system) environment is a complicated task. There are several factors that contribute to the interaction experience: client performance, client load, network characteristics, network performance, server performance, and server load. Further, if the application executing on the server is required to make additional network calls to other servers, then extra measurements are added to the interaction time. As used herein, the interaction experience refers to the time between the end-user providing input to the application at a client and the graphic response to that input being displayed on the client. The interaction experience can be thought of as the end-user's experience while using a client of the SBC.

Because different applications behave in different ways when responding to different input events, it is difficult to establish a method for arbitrary applications in which the interaction experience can be accurately measured. In the past, monitoring solutions have been built around measuring traffic between the client and the server components of the SBC. An example of a known method is the "ping" utility. Ping uses the Internet Control Message Protocol (ICMP) Echo function which is detailed in RFC 792. A small packet of information containing an ICMP ECHO_REQUEST is sent through the network to either a particular IP address or a domain name. The computer that sent the packet then waits (or 'listens') for a ECHO_REPLY packet from the specified IP address. The ping program then evaluates this reply, and a report is shown. You can check several things with the ping program: can you reach another computer, how long does it take to bounce a packet off of another site.

SUMMARY OF THE INVENTION

The following presents a simplified summary of the invention in order to provide a basic understanding of some aspects of the invention. This summary is not an extensive overview of the invention. It is not intended to neither identify key or critical elements of the invention nor delineate the scope of the invention. Its sole purpose is to present some concepts of the invention in a simplified form as a prelude to the more detailed description presented below.

The present invention provides systems and methods for determining the interaction experience in a SBC environment. In addition to measuring the network response time, the present invention measures the application response time and the client time required to display the application response. Within a session in SBC environment, a "stealth" monitoring application executes on a server in addition to the user's standard applications. The stealth application is not seen by the user and generates a graphic response that when processed by the client is undetectable by the end-user.

In one aspect, the invention features a method of generating a measurement for use in calculating an end-user experience metric in a server-based computing environment. The method includes transmitting a message from a client of the server-based computing environment to an application executing in a user space provided by an operating system of the server, receiving a graphic response for execution by the client from the application, and determining an amount of time elapsed between the transmission of the message and the conclusion of the execution of the graphic response by the client.

Various embodiments can include starting a timer at the client when the message is transmitted and stopping the timer at the conclusion of the execution of the graphic response, having a windowless application executing on the server, and executing the application automatically upon initiation of another application for use by the end-user of the client. The application can run in the same user space as the other applications executing on the server.

Other embodiments can include, transmitting the message when the end-user of the client performs a specified task, generating an input event when the server receives the message from the client and forwarding the input event to the application, and generating the graphic response after the application processes the input event.

In one embodiment, the graphic response is undetectable by the end-user of the client machine. In some embodiments, the response includes instructions to change a small number of pixels on a display of the client, instructions to change a single pixel on a display of the client, instructions to cycle a pixel on a display of the client through a range of values, and instructions to cycle a pixel on a display of the client through a range of locations. For example, a slightly different graphic response is generated for each measurement in a sequence, which causes a cycling effect over the span of several measurements.

In yet other embodiments, the client transmits the elapsed time from the client to another computing element for use by the other computing element, the elapsed time is compared to an expected elapsed time, and repeating certain functions at a periodic interval.

In another aspect, the invention features a system for generating a measurement for use in calculating an end-user experience metric in a server-based computing environment. The system includes a server and a client in communication with the server. The server executes an application in a user space provided by an operating system of the server. The application is capable of receiving an input and generating a graphic response for execution by the client. The client transmits a message to the server, receives the graphic response from the server, and calculates an elapsed time between the transmission of the message and the conclusion of the execution of the graphic response.

In yet another aspect, the invention features a computer readable medium having executable instructions thereon to generate a measurement for use in calculating an end-user experience metric in a server-based computing environment. The computer readable medium includes instructions to transmit a message from a client of the server-based computing environment to an application executing in a user space provided by an operating system of the server, instructions to receive a graphic response for execution by the client from the application, and instructions to determine an amount of time elapsed between the transmission of the message and the conclusion of the execution of the graphic response

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention provides systems and methods for determining the interaction experience in a SBC environment. In addition to measuring the network response time, the present invention measures the application response time and the client time required to display the application response. Within a session in SBC environment, an application that is invisible to the end-user of a client executes on a server in addition to the user's standard applications. The invisible application generates a graphic response that when executed by the client is undetectable by the end-user. Upon execution of the graphic response, the invention determines an elapsed time that represents the interaction experience of the end-user.

Figure 1:
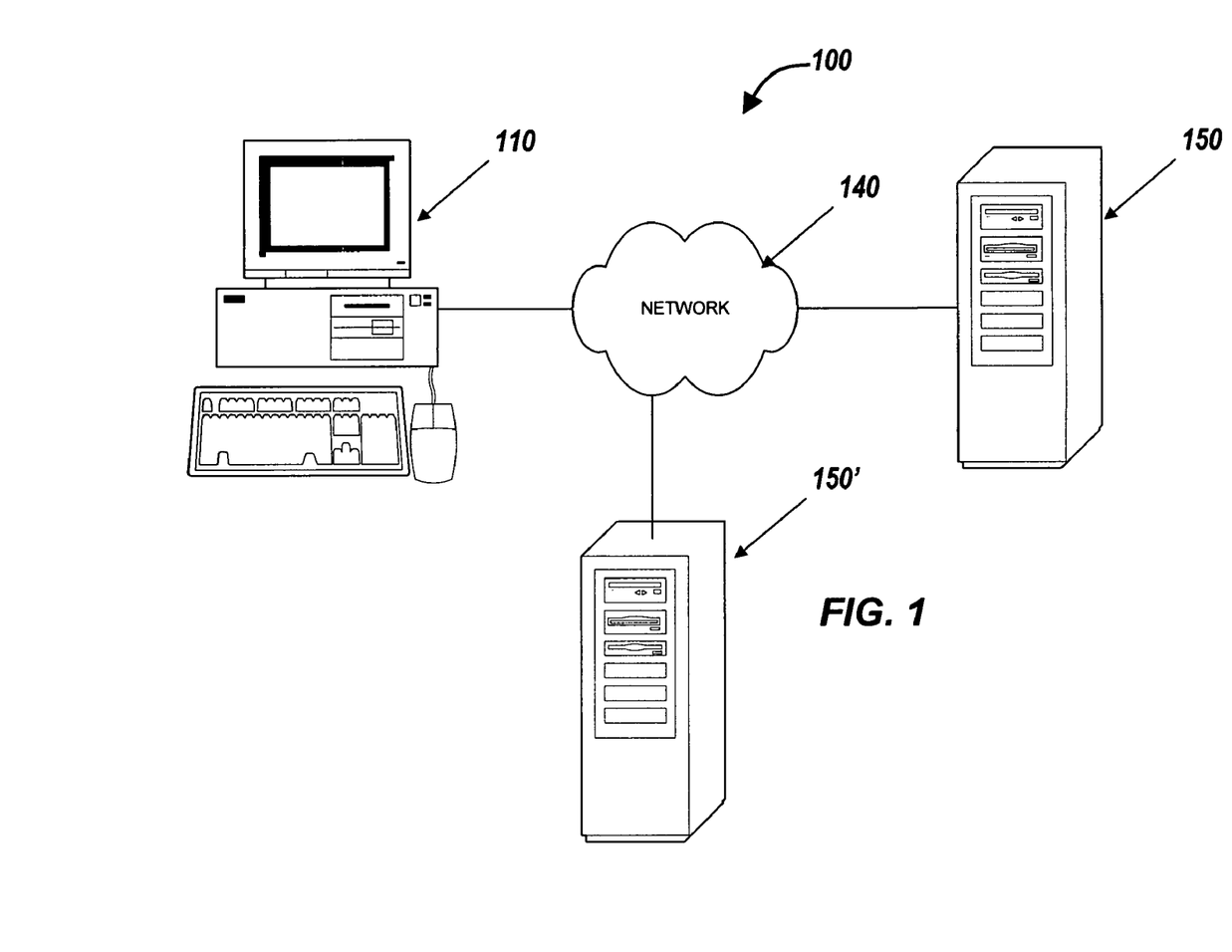
FIG. 1 shows an embodiment of a server based computing (SBC) environment.

With reference to FIG. 1, a server based computing environment (also referred to as a distributed application processing system) 100 includes one or more clients 110', 110" (hereinafter each client or plurality of clients is generally referred to as 110) in communication with one or more servers 150', 150" (hereinafter each server or plurality of servers is generally referred to as 150) via a communications network 140. The network 140 can be a local-area network (LAN), a medium-area network (MAN), or a wide area network (WAN) such as the Internet or the World Wide Web. Users of the client 110 can be connected to the network 140 through a variety of connections including standard telephone lines, LAN or WAN links (e.g., T1, T3, 56 kb, X.25), broadband connections (e.g., ISDN, Frame Relay, ATM), and wireless connections (e.g., IEEE 802.11). The connections can be established using a variety of communication protocols (e.g., TCP/IP, IPX, SPX, NetBIOS, and direct asynchronous connections). In some particularly advantageous embodiments, the protocol used may be the Independent Computing Architecture protocol manufactured by Citrix Systems, Inc. of Fort Lauderdale, Fla. or the Remote Display Protocol manufactured by Microsoft Corporation of Redmond, Wash.

The bandwidth and latency of the network 140 is one factor that affects the interaction experience of the end-user of the SBC environment 100. Other factors include the number of applications executing on the server 150, the amount of data being executed (or load) of the applications of the server 150, the amount of processing (or load) being done by the client computer 110. During operation of the SBC environment 100, each of these factors fluctuates. As data is transmitted through the network 140 the amount of available bandwidth of the network is reduced. The number of requests to the server 150 increase and decrease thereby varying the load of the server 150. One aspect of the invention features systems and method for determining whether and how these independent changes affect the interaction experience of the end-user.

Figure 2:
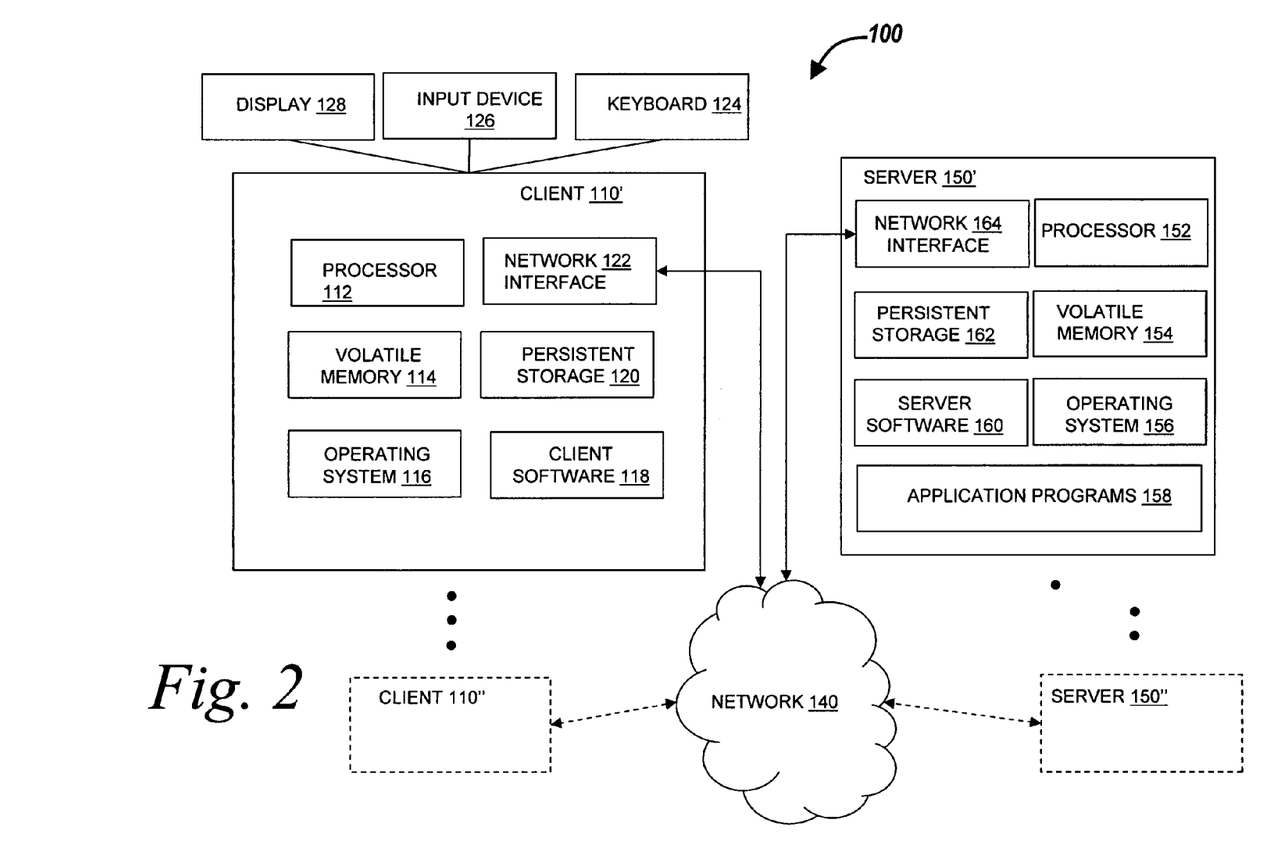
FIG. 2 is a conceptual block diagram of the SBC of FIG. 1

FIG. 2 depicts a conceptual block diagram of the SBC environment 100. The client 110 typically includes a processor 112, a volatile memory 114 (e.g., RAM cache), an operating system 116, client software 118, a persistent storage memory 120, a network interface 122 (e.g., a network interface card, a keyboard 124, at least one input device 126 (e.g., a mouse, trackball, space ball, light pen and tablet, stylus, and any other input device), and a display 128. Operating system 116 can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, Java, PALM OS, SYMBIAN OS, LINUX, SMARTPHONE OS, and UNIX. The client software 118 issues a message to the server 150 and receives a response from the server 150. The client software 118 uses the response to determine the interaction experience as perceived by the end-user of the client at the display 128.

The client 110 can be any personal computer (e.g., 286, 386, 486, Pentium, Pentium II, Macintosh computer), Windows-based terminal, Network Computer, wireless device, information appliance, RISC Power PC, X-device, workstation, minicomputer, main frame computer, cellular telephone or other computing device that provides sufficient memory for executing the operating system 116 and the client software 118. It should be understood that the client software 118 can be integral with the operating system 116 or a standalone software module.

Similarly, the server 150 may include a processor 152, a volatile memory 154, an operating system 156, application programs 158, server software 160, persistent storage memory 162, and a network interface 164. The server software 160 responds to the message received from the client 110 with a graphic response message. The server software 160 executes in a user space defined by the operating system 156 and interfaces with application programs 158 and other components of the computing device 150. In the SBC environment 100, execution of application programs 158 occurs primarily on a server 150 and the user interface produced by application execution is transmitted over the network 140 to the client 110. The user provides inputs, such as keystrokes and mouse movements, at the client 110 which are transmitted over the network 140 to the server 150 to instruct the application programs 158 to perform further tasks.

Each computing device 150 hosts one or more application programs 158 that can be accessed by the remote display units 110. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, application set managers, or computer-aided design and manufacturing applications, such as AUTOCAD sold by Autodesk of San Rafael, Calif., CATIA sold by Dassault Systemes of Suresnes Cedex, France, and PRO/ENGINEER sold by Parametric Technology Corporation of Needham, Mass.

Figure 3:
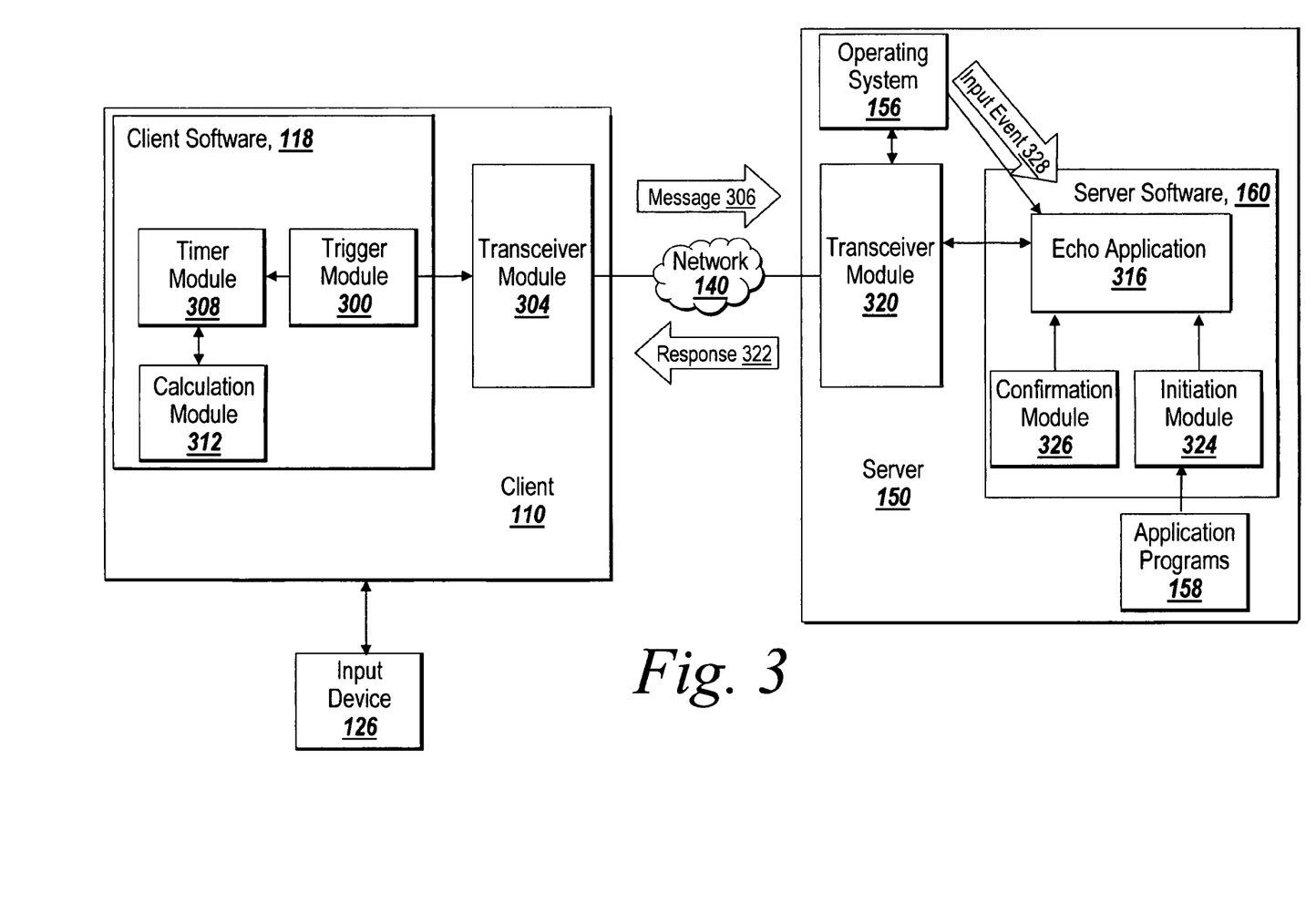
FIG. 3 is a conceptual block diagram of an embodiment of client software and server software for use in the SBC constructed according to principles of the invention.

FIG. 3 is a conceptual block diagram of an embodiment of the client software 118 and server software 160 constructed according to principles of the invention. It should be understood the various modules are not necessarily individual applications. Instead, the modules can be provided as a single software application or grouped as any combination of individual applications. Additionally, certain modules may be physical hardware.

The client software 118 is in communication with a transceiver module 304 of the client 110. The client software 118 includes a trigger module 300 in communication with the transceiver module 304. The trigger module 300 generates a message 306 that is transmitted to the server software 160. The message 306 is configured to generate a response from the server software 160 when the message is processed by the server 150. For example, the message can include a user input event that results in a graphical response from the server. In one embodiment, the trigger module 300 generates the message 306 on a periodic basis. The length of the period can be configurable by the end-user or another user such as a system administrator. In another embodiment, the trigger module generates the message 306 in response to a specific end-user input using input device 126.

The transceiver module 304 is in communication with network 140 and is configured to transmit the message 306 from the client 110 to the server 150 via the network 140 and receive a response from the server 150. If necessary, the transceiver module 304 formats the message 306 for transmission via the network 140 and formats the response for execution by the client software 118.

Optionally, the client software 118 can include a timer module 308 and a calculation module 312. The timer module 308 is in communication with the trigger module 300 and the calculation module 312. The timer module 308 is configured to measure the elapsed time from the generation of the message 306 until the client 110 completes the instructions included in the response from the server. In one embodiment, the timer module 308 generates a start timestamp and a completion timestamp and determines the elapsed time therebetween. In another embodiment, the timer module acts as a stopwatch and generates the elapsed time without performing calculations. In one embodiment, the elapsed time is sent to another server 150' for further processing, such a calculation of an expected elapsed time, trending analysis, and storage. In another embodiment, the elapsed time is forwarded to the calculation module from comparison against an expected value to determine if the SBC environment 100 is operating within specification. In still another embodiment, the elapsed time is forwarded to the server 150 that the client is communicating with.

The server software 160 is in communication with a transceiver module 320 of the server 150. The server software 160 includes an echo application 316, an optional initiation module 324, and an optional confirmation module 326. The server software 160 is in communication with the application programs 158 and the operating system 156 that are executing on the server 150. The echo application 316 is in communication with the transceiver module 320 and if present each of the initiation module 324 and the confirmation module 326. In one embodiment, the echo application 316 is invisible to the end-user of the client 110. For example, the echo application 316 can be a windowless (e.g., stealth application). The end-user does not interact directly with the echo application 316.

The echo application generates a graphical response 322 to the message 306 from the client software 118. The graphical response message 322 includes instructions to manipulate, modify, update, alter, or change the display 128 of the client 110 in a manner that is not perceivable by the end-user of the client 110, but is perceivable by client software 118 of the client 110. In one embodiment, the echo application 316 executes invisibly alongside the application programs 158. In such an embodiment, the echo application 316 is subject to the same environmental effects and changes as the application programs 158.

The transceiver module 320 is in communication with network 140 and is configured to transmit the response 322 from the server 150 to the client 110 via the network 140 and receive the message 306 from the client 110. If necessary, the transceiver module 304 formats the response 320 for transmission via the network 140 and formats the message 306 for execution by the server 150. The transceiver module forwards the received message 306 to the operating system 156 of the server 150.

The operating system 156 is configured to read and process the message 306 to generate an input event 328 for the echo application 316. The input event 328 can be a known Windows® input event or a custom input event. Conceptually, the input event 328 is configured to cause the echo application 316 generate the graphic response 322.

The initiation module 324 is in communication with the application programs 158 and the operation system 156. In one embodiment, the initiation module 158 monitors the application programs 158 and automatically initiates the echo application 316 when a specific one of the application of the application programs 158 begins executing on the server 150. In another embodiment, the initiation module 324 initiates the echo application when the server 150 receives the message 306. In another embodiment, the echo application 316 is initiated when a client/server session begins and remains quiescent until the message 306 is received. It should be understood that the initiation module can initiate one or more instances of the echo application 316. For example, if multiple clients 100 are using the SBC environment, the initiation module 324 starts a respective echo application 316 for each client.

The confirmation module 326 is in communication with the echo application 316. In one embodiment, a function performed by the confirmation module 326 includes monitoring the echo application 326 to ensure an instance of the echo application 326 is executing for each SBC environment session. The confirmation module 326 reports whether the echo application 316 is running and functioning properly to another server 150' of the SBC environment or the operating system 156 of the server 150.

Figure 4:
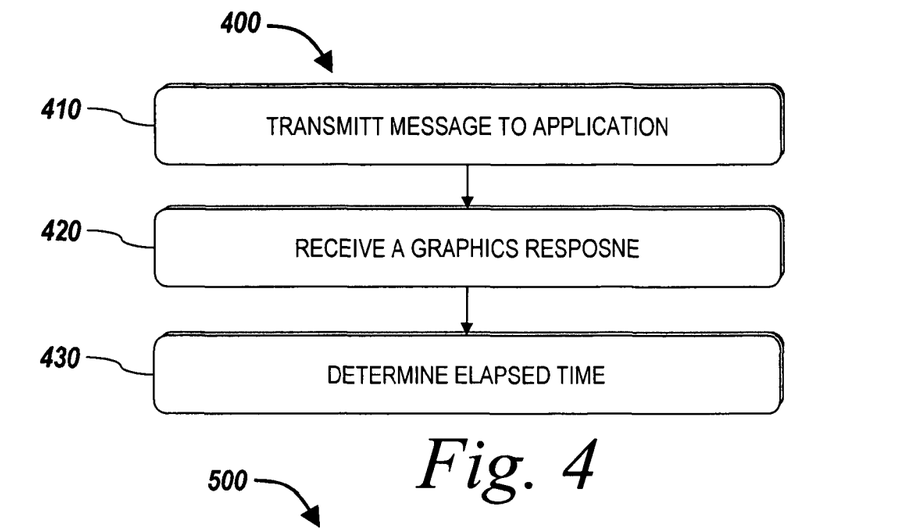
FIG. 4 is a flow chart of an embodiment of a method that operates according to principles of the invention.

With reference to FIG. 4, an embodiment of a method 400 of operation and interaction between the client 110 and server 150 is described. As a general overview, the method can be conceptualized as a generating a measurement for use in calculating an end-user experience metric in the server based computing environment 100. The operation of the client software 118 and the server software 160 includes transmitting the message 306 to the application 316 (step 410), receiving a graphic response (step 420) from the application 316, and determining an elapsed time (step 430) that represents the end-user's interaction experience.

In one embodiment, the trigger module 300 on the client software 118 transmits the message 306 via the transceiver 304 on a periodic basis. In another embodiment, the trigger module 300 generates the message 306 in response to end-user input. The message 306 can include instructions to generate a Windows message that is forwarded to the application 316. Alternatively, the message 306 can be the Windows message and represent an input event to the application 316. In one embodiment, the message 306 is transferred over a separate virtual channel within the ICA protocol stream, and a Windows message generated by the server software 160 when the message 306 is received.

When the server software 160 receives the message 306, the echo application 316 processes the instructions of the message 306 and generates the graphic response 322. In one embodiment, the graphic response 322 generates a change on the display 128 of the client that is undetectable by the end-user. In various embodiments, the graphic response 322 can include instructions to change a small number of pixels on the client display 128, instructions to change single pixel at the origin (i.e., top left corner) of the client display 128, instructions to cycle a pixel of the display 128 through a range of values, or instructions to cycle a change through a range of pixel locations of the display 128.

When the client software 118 processes the graphic response 322, the elapsed time between the transmission of the transmission of the message 306 and the completion of the processing of the graphic response 322 is determined. In one embodiment, the client software 118 determines the elapsed time and forwards the elapsed time to a central server 150' for storage and trending analysis. In another embodiment, a start timestamp and an end timestamp are forwarded from the timer module 308 the central server 150'. In such an embodiment the central server 150' determines the elapsed time. It should be understood that the elapsed time measurement is equivalent to the interaction experience as used herein.

The central server 150' can store multiple interaction experience measurements. The stored measurements can be used to isolate which portion of the SBC is not performing as expected. For example, network timing measurement for the same time period can be compared to the interaction experience to isolate application and server load trends. Also, the stored interaction experience measurements can be analyzed using known methods to determine an expected interaction experience value. The expected value can be compared to the measured value, either by the calculation module 312 of the client software 118 or the central server 150', to determine of the SBC environment is operating as expected.

Figure 5:
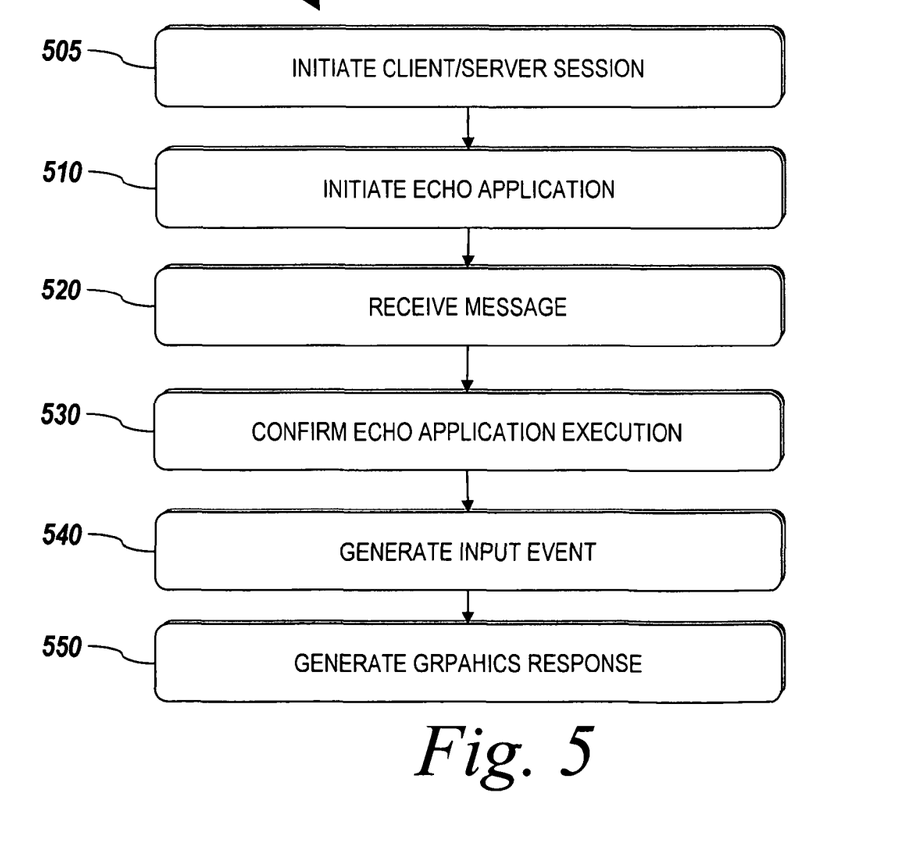
FIG. 5 is a flow chart of an embodiment of a method of operation of the server software constructed according to principles of the invention.

With reference to FIG. 5, an embodiment of the operational method 500 of the server 150 and server software 160 is described. After the client 100 initiates (step 505) a client server session, the server software initiates (510) the echo application 316. The server 150 receives (step 520) the message 306 from the client 110. Once the message 306 is received, the confirmation module 326 confirms (step 530) that the echo application 316 is executing. From the message 306, the operating system 156 generates (step 540) the input event 328 that is processed by the echo application to generate (step 550) the graphic response 322.

The server software 160 initiation module 324 initiates (step 510) the echo application 316 when the client 110 starts the client/server session. In one embodiment, a single echo application 316 is initiated. In other embodiments, an echo application 316 is started for each of the applications programs 158 executing on the server 150. In such embodiments, the interaction experience can be measured on an application by application basis. In another embodiment, a single echo application 316 with multiple program application programs 158 executing on the server 150. For example, a client/server session can have multiple clients 110 communicating with server 150. Each of the clients 110 connects to the server 150 through a different network path and thus has a different interaction experience. The echo application 316 is not visible to the user. That is, the user does not interact directly with the echo application 316 and the echo application 316 is not show on the display 128 of the client. In one embodiment, the echo application 316 is a windowless application.

The transceiver module 320 receives (step 520) the message 306 from the client 110. In one embodiment, the transceiver module 320 includes a network interface card that communicates with the network 140. The transceiver module can format the received message 306 so that the message 306 is readable by the operating system 156.

Prior to generating the graphic response 322, the confirmation module 326 confirms (step 530) that the echo application 316 is executing in user space assigned by the operating system 156. In one embodiment, the confirmation module 326 communicates an indication that the echo application 316 is executing to the operating system 156. In one embodiment, the server 150 creates a log even on the server 150 to indicate that echo application 316 was not running when the message 306 was received or when the client/server session was initiated.

Once confirmation of the execution of the echo application 326 is received, the operating system 156 processes the message 306 thereby generating (step 540) the input event 328. In one embodiment, the input event is a Windows message that is forwarded to the echo application 316 to model a normal input event Windows message. The input event is designed to cause the echo application 326 to generate a graphic response 322. Exemplary input events can include, but are not limited to, mouse movements, keyboard strokes, window generation, window destruction, or any other event that generates a graphic response from the echo application 316. In another embodiment, the input event is a custom "user-defined" application specific Windows message.

The echo application 316 processes the input event 328 and generates (step 550) the graphic response 322, which is in turn forwarded to the client 110. In various embodiments, the graphic response 322 is generated once the echo application 316 has performed a set of tasks such as: calculations, memory usage, disk access, and network resource access. The echo application 316 can be configured by an administrator to perform specified tasks. In another embodiment, the echo application 316 can perform execution tasks that mirror an application program 158 executing on the server 150 and generate the graphic response 322. I In one embodiment, the graphic response 322 includes instructions that cause a change on the display 128 of the client 110 that is not detectable by the end-user. For example, the graphic response 322 includes instructions to change a single pixel at the origin of the display. More complex graphic responses can be used to differentiate from graphic generated by the application programs 158 or to detect any response indicators lost from graphic protocol optimizations. For example, the pixel value can cycle through an expected range of values. In another embodiment, the graphic response causes a pixel location to cycle through an expected range of pixel locations. Another example of a graphic response is a BitBlt with an unexpected Raster-Operation, either to the display 128 or an off-screen surface (e.g., an off-screen buffer).

In addition to measuring the overall end-user interaction experience, the present invention, in various embodiments, can measure and record sub-metrics that comprise the overall end-user interaction experience metric. Generally, these sub-metrics include the time required by the client 110 to generate and send the trigger message 306, the network 140 latency, the time required by the server 150 to process the message 306 and generate and transmit the graphic response 322, and the time required by the client 110 to process the graphic response 322.

Figure 6:
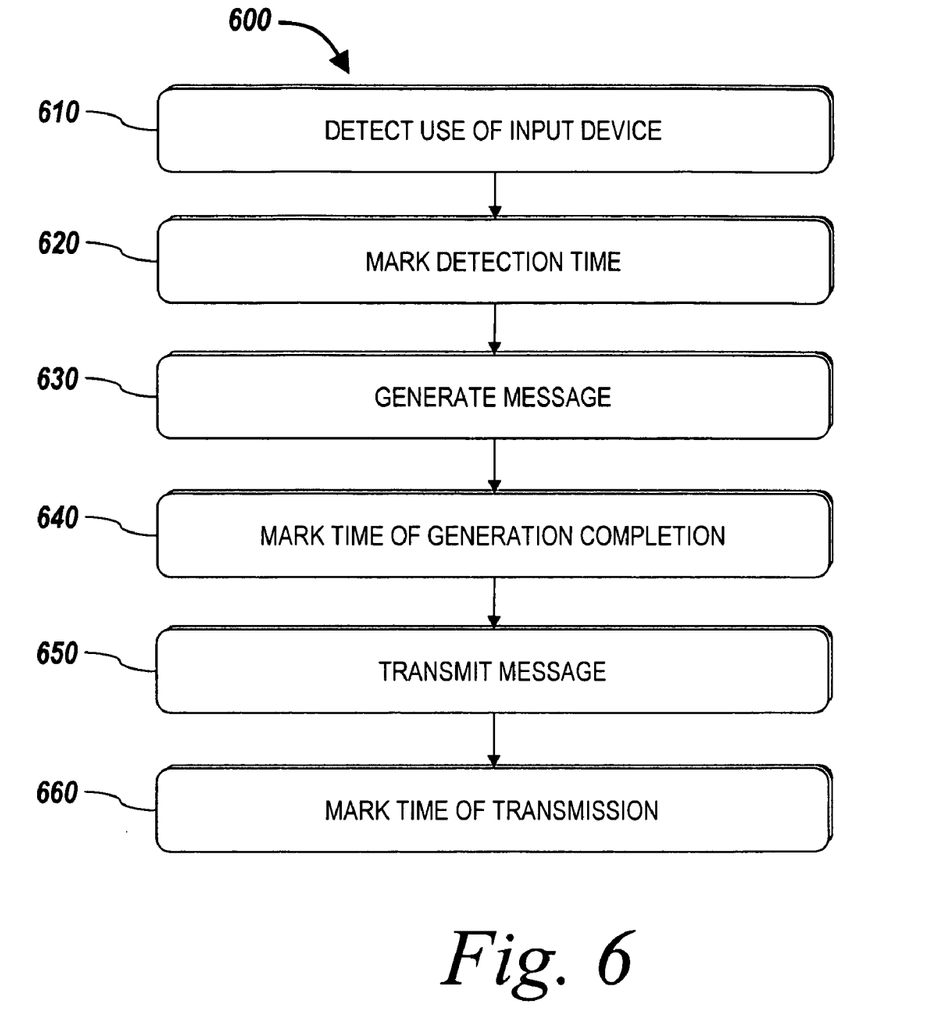
FIG. 6 is a flow chart of an embodiment of a method of generating sub-metrics by the client operating according to principles of the invention.
Figure 7:
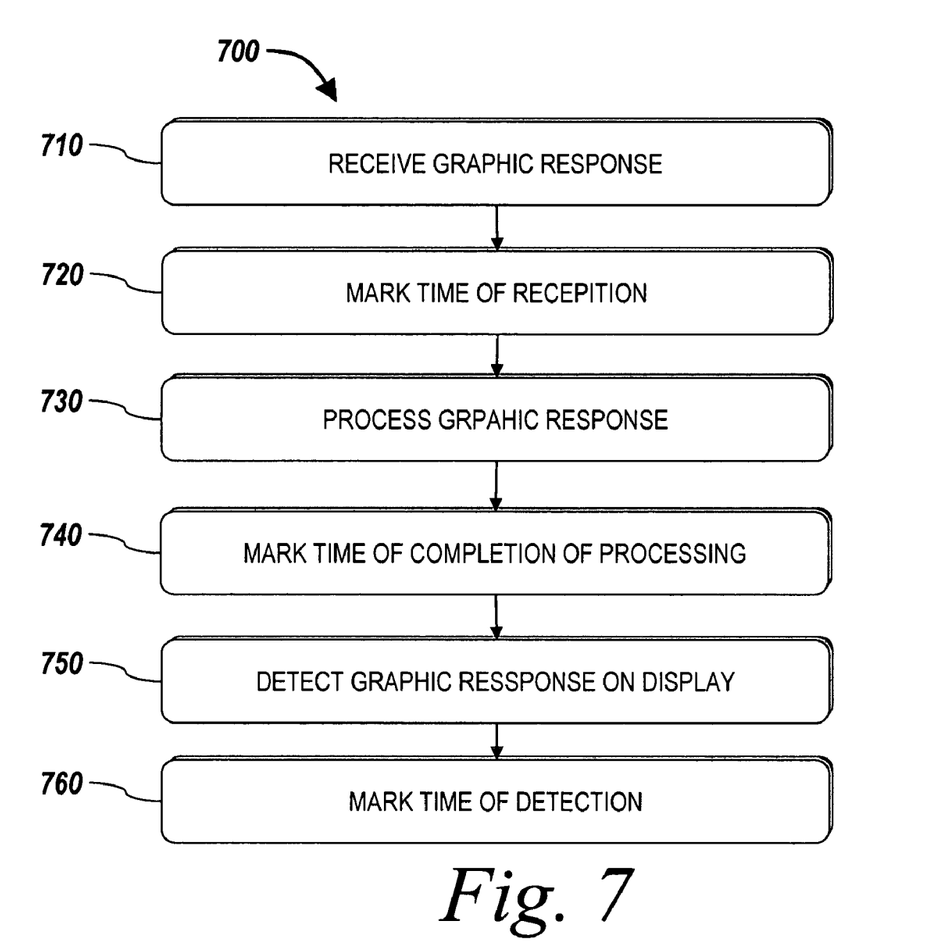
FIG. 7 is a flow chart of an embodiment of a method of generating sub-metrics by the client operating according to principles of the invention.

With reference to FIG. 6 and FIG. 7, embodiments of a method of generating client 110 sub-metrics are described. From the perspective of the client 110, there are two types of sub-metrics that are generated a) those related to generating and transmitting the trigger message 306 as shown in FIG. 6 and b) those related to detecting and processing the graphic response 322 as shown in FIG. 7.

With reference to FIG. 6, one embodiment of a method 600 for capturing sub-metrics related to generating the trigger message 306 is described. Assuming that the trigger message 306 is generated in response to use of the input device 126, the trigger module 304 detects (step 610) use of the input event and marks (step 620) the time of detection. The trigger module generates (step 630) the message 306 and marks (step 640) the time the message generating is completed. The trigger module 300 forwards the message 306 to the transceiver 304, which then transmits (step 650) the message 306 to the server 150. The trigger module 300 or the transceiver module 304 marks (step 660) the time the message 306 is transmitted to the server 150.

With reference to FIG. 7, one embodiment of a method 700 for capturing sub-metrics related to processing the response 322 is described. The transceiver 304 receives (step 710) the graphic response 322 from the server 150 and marks (step 720) the time of receipt. The client software 118 process (step 730) the graphic response 322. Upon completion of processing the graphic response 322, the client software 118 marks (step 740) the time of completion. Once complete, the client software 118 displays the graphic response and detects (step 750) that the graphic response 322 is displayed. The client software 118 also marks (step 760) the time of detection on the display 128.

The above-described actions of marking certain times that indicate the occurrence of certain events can occur in different ways. In one embodiment, multiple timers are started and stopped by the timer module 308 upon the occurrence of each of the above-described events. In another embodiment, a single timer is used and the split times (i.e., the time elapsed between the occurrence of the events) are saved in a table that is accessible by the calculation module 312. In still another embodiment, a time stamp is added to the message 306 and the graphic response 322 for each of the marking actions. In such an embodiment, prior to transmitting the message 306 the time stamps are reported to the calculation module 312, where the elapsed time between each time stamp is determined. These elapsed times represent the above-described different sub-metrics. It should be understood that various combinations of the elapsed times can also be used. For example, the time stamp related to the detection of the use of the input device and the time stamp that indicates the transmission of the message 306 can be processed to determine the total elapsed used by the client 110 to generate and send the message 306 to the server 150. The principles described above with respect to the generation of the message 306 are equally applicable to the processing of the graphic response 322 by the client 110.

Figure 8:
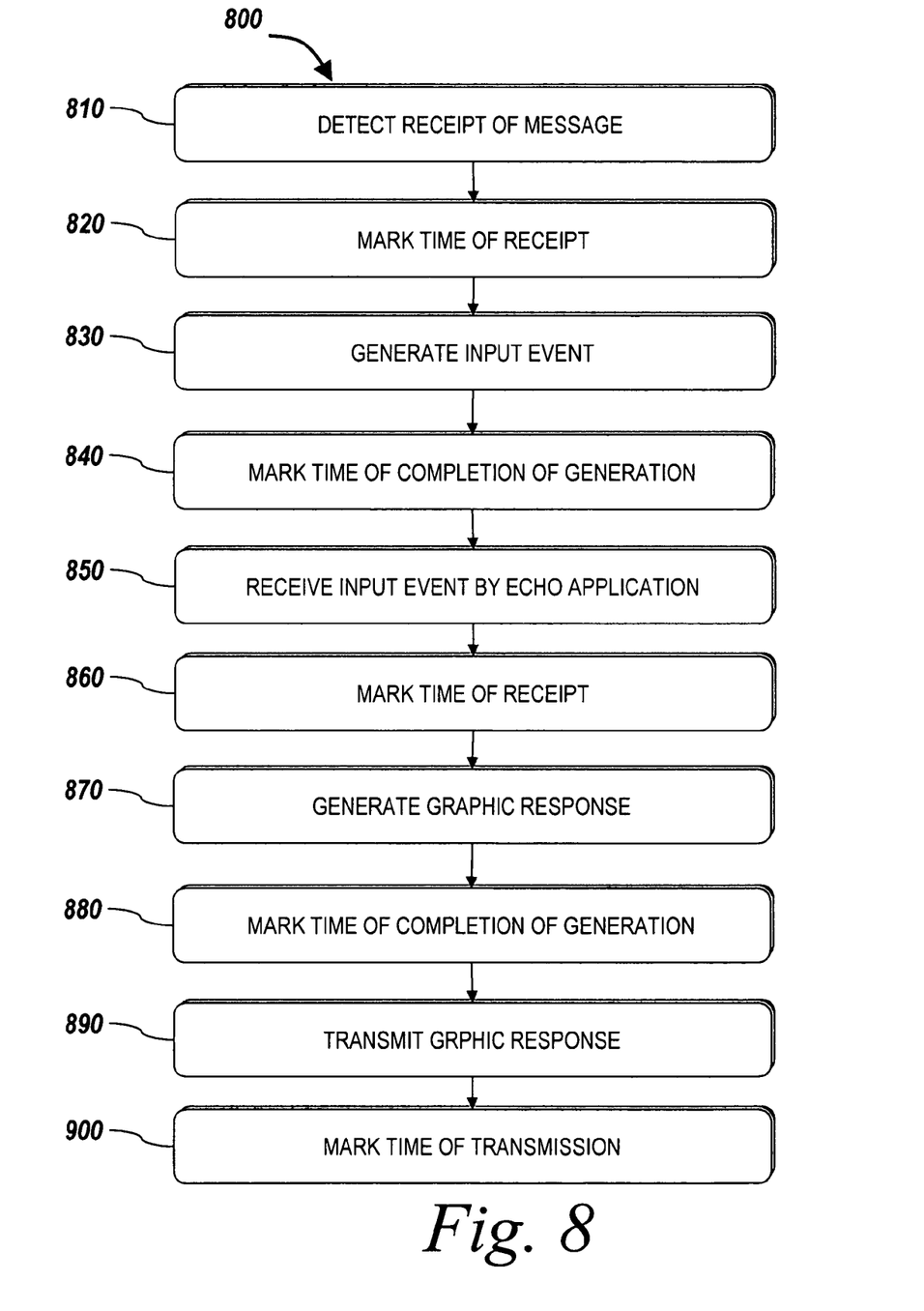
FIG. 8 is a flow chart of an embodiment of a method of generating sub-metrics by the server operating according to principles of the invention.

With reference to FIG. 8, one embodiment of a method 800 for capturing sub-metrics related to generating the graphic response 322 is described. The transceiver 320 receives (step 810) the message 306 from the client 110 and marks (step 820) the time of receipt. The operating system 156 then generates (step 830) the input event 328. The server software 160 marks (step 840) the time of completion of the generation of the input event 328. The echo application 316 receives (step 850) the input event 328 and the server software 160 marks (step 860) the time of receipt of the input event 328. Once the echo application 316 receives the input event, the echo application 316 generates (step 870) the graphic response 322. The server software 160 marks (step 880) the time the echo application 316 completes generating the graphic response 322. In one embodiment, the time required to generate the graphic response 322 by the echo application 316 includes the echo application performing additional executions tasks that similar to those performed by the application programs 158. The transceiver module 320 receives the graphic response 322 and transmits (step 890) the graphic response 322 to the client 110. The server software also marks (steps 900) the time the graphic response 322 is sent.

Similar to the marking of events described with reference to the client 110, the same methods can be employed with regard to the server 150. In one embodiment, multiple timers are started and stopped by the timer module 308 upon the occurrence of each of the above-described events. In another embodiment, a single timer is used and the split times (i.e., the time elapsed between the occurrence of the events) are saved in a table that is accessible by the calculation module 312. In still another embodiment, a time stamp is added to the graphic response 322 for each of the marking actions. In such an embodiment, upon receipt of the graphic response 322 the time stamps are reported to the calculation module 312, where the elapsed time between each time stamp is determined. These elapsed times represent the above-described different sub-metrics. It should be understood that various combinations of the elapsed times can also be used. For example, the time stamp related to detecting receipt of the message 306 and the time stamp that indicates the transmission of the graphic response 322 can be processed to determine the total elapsed used by the server 150 to generate and send the graphic response to the client 110.

The above-described sub-metrics are useful in determining the location within the SBC environment 100 where a problem with the performance of the SBC is occurring. Each of the sub-metrics can be recorded and trended in a manner similar to the overall end-user interaction experience. Each of the sub-metrics can be compared against an expected value for that sub-metric. Exceeding the expected value indicates an area within the SBC that is not performing as expected.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of generating an end-user experience metric representing a latency perceived by an end-user of a client, the client interacting with a measurement application program executed by a server on behalf of the client in a server-based computing environment, the method comprising:
   (a) transmitting, by a measurement application executing on a client, a first message to a server;
   (b) initiating, by an initiation module executing on the server, a plurality of echo applications responsive to receiving the first message, wherein each echo application represents an application executing on the server;
   (c) generating, by a trigger module executing on the client, an input event responsive to receiving end-user input for the application executing on the server;
   (d) transmitting, by a transceiver module executing on the client, the input event to the application executing on the server;
   (e) performing, by at least one echo application of the plurality of echo applications, a pre-determined task responsive to receiving the input event generated by the trigger module;
   (f) generating, by the at least one echo application of the plurality of echo applications, upon completion of the pre-determined task, a second message comprising instructions to modify a display of the client;
   (g) receiving, by the measurement application, the second message;
   (h) modifying, by the measurement application, the display of the client responsive to receiving the second message from the server; and
   (i) determining, by the measurement application, an end-user experience metric using an amount of time measured between transmission of the first message and execution of the modification instructions of the second message by the measurement application.

2. The method of claim 1 further comprising determining an amount of time elapsed between when the measurement application generates and transmits the first message.

3. The method of claim 1 further comprising determining an amount of time elapsed between when the measurement application receives the second message and detects a modification of the display of the client.

4. The method of claim 1 further comprising determining an amount of time elapsed between when the server receives the first message and transmits the second message.

5. The method of claim 1 further comprising determining at least one amount of time elapsed between two modules executing on the server.

6. The method of claim 1 further comprising starting a timer executing on the client when the first message is transmitted and stopping the timer at the conclusion of a modification of the display of the client.

7. The method of claim 1 wherein the at least one echo application executing on the server comprises a windowless application.

8. The method of claim 1 wherein the plurality of echo applications execute automatically upon initiation of another application for use by the end-user of the client.

9. The method of claim 1 wherein the transmission of the first message occurs when the end-user of the client performs a specified task.

10. The method of claim 1 further comprising generating an input event by the server, when the server receives the first message from the client and forwarding the input event to the at least one echo application.

11. The method of claim 10 wherein the second message is generated in response to the at least one echo application processing the input event.

12. The method of claim 10 wherein the second message is generated in response to the at least one echo application processing the input event and at least one execution task.

13. The method of claim 1 wherein a modification of the display of the client is undetectable by the end-user of the client machine.

14. The method of claim 1 wherein the second message comprises instructions to change a small number of pixels on the display of the client.

15. The method of claim 1 wherein the second message comprises instructions to change a single pixel on the display of the client.

16. The method of claim 1 wherein the second message comprises instructions to cycle a pixel on the display of the client through a range of values.

17. The method of claim 1 wherein the second message comprises instructions to cycle a pixel change on the display of the client through a range of locations.

18. The method of claim 1 further comprising transmitting the elapsed time from the client to another computing element for use by the another computing element.

19. The method of claim 18 further comprising comparing, by the another computing element, the elapsed time to an expected elapsed time.

20. The method of claim 1 further comprising repeating (a)-(d) at a periodic interval.

21. The method of claim 20 further comprising transmitting each elapsed time measurement to another computing element that calculates an expected value for the elapsed time measurement.

22. The method of claim 21 further comprising comparing a current elapsed time measurement to the expected elapsed time measurement.

23. The method of claim 1 wherein the at least one echo application executes in the same environment and at the same time as other applications executing at the server.

24. The method of claim 1 wherein the server includes a plurality of echo applications, wherein each echo application executes for each client in a server based computing environment, each echo application executing in a user space established by the server.

25. A system for generating an end-user experience metric representing a latency perceived by an end-user of a client, the client interacting with a measurement application program executed by a server on behalf of the client in a server-based computing environment comprising:
   a client computing device in communication with a server;
   a measurement application executing on the client computing device
      transmitting a first message to the server initiating a plurality of echo applications, wherein each echo application represents an application executing on the server
      receiving a second message comprising instructions to modify a display of the client computing device from the server; and
      calculating an elapsed time between the transmission of the first message and the conclusion of the execution of the modification instructions of the second message by the measurement application;

a trigger module executing on the client computing device generating an input event responsive to receiving end-user input for the application executing on the server; and a transceiver module executing on the client computing device transmitting the input event to the application executing on the server;

the server;

an initiation module executing on the server initiating the plurality of echo applications in a user space established by the server, responsive to receiving the first message;

performing a pre-determined task responsive to receiving the input event generated by the trigger module; and generating the second message upon completion of a pre-determined task by at least one echo application of the plurality of echo applications.

26. The system of claim 25 wherein the client determines an amount of time elapsed between when the measurement application generates and transmits the first message.

27. The system of claim 25 wherein the client determines an amount of time elapsed between when the measurement application receives the second message and detects a modification of the display of the client.

28. The system of claim 25 wherein the measurement application determines an amount of time elapsed between when the server receives the first message and transmits the second message.

29. The system of claim 25 wherein the client determines at least one amount of time elapsed between two modules executing on the server.

30. The system of claim 25 further comprising a timer in communication with the client, the timer starting when the client transmits the first message and stopping at the conclusion of the execution of the modification instructions by the second message.

31. The system of claim 25 further comprising a confirmation module executing on the server to monitor the status of the echo application.

32. The system of claim 25 wherein the echo application is a windowless application.

33. The system of claim 25 further comprising an initiation module that automatically initiates the plurality of echo applications upon initiation of another application by the end-user of the client.

34. The system of claim 25 further comprising a generator module in communication with the server, the generator module receiving the first message from the client and generating an input event that is transmitted to the echo application.

35. The system of claim 34 wherein the second message is generated in response to the echo application processing the input event.

36. The system of claim 34 wherein the second message is generated in response to the echo application processing the input event and at least one execution task.

37. The system of claim 25 further comprising another computing element in communication with the client, the another computing element receiving the calculated elapsed time from the client.

38. The system of claim 37 wherein the another computing element comprises a comparator module for comparing the received elapsed time value to an expected value.

39. The system of claim 25 further comprising a triggering module executing on the client, the triggering module initiating transmission of the first message to the server when the end-user of the client performs a specified activity.

40. The system of claim 25 further comprising a triggering module executing on the client, the triggering module initiating transmission of the first message to the server periodically.

41. The system of claim 40 comprising another computing element in communication with the client, the another computing element receiving the calculated elapsed times from the client and generating an expected value from the received elapsed times.

42. The system of claim 41 wherein a modification of the display of the client is undetectable by the end-user of the client machine.

43. The system of claim 25 wherein the second message comprises instructions to change a small number of pixels on the display of the client.

44. The system of claim 25 wherein the second message comprises instructions to change a single pixel on the display of the client.

45. The system of claim 25 wherein the second message comprises instructions to cycle a pixel on the display of the client through a range of values.

46. The system of claim 25 wherein the second message comprises instructions to cycle a pixel change on the display of the client through a range of locations.

47. The system of claim 25 wherein the echo application executes in the same environment and at the same time as other applications executing at the server.

48. The system of claim 25 wherein the server includes a echo application executing for each client in a server based computing environment, each echo application executing in a user space established by the server.

49. An article of manufacture having executable instructions stored thereon causing the computer to generate an end-user experience metric representing a latency perceived by an end-user of a client, the client interacting with a measurement application program executed by a server on behalf of the client in a server-based computing environment, the article of manufacture comprising:

computer readable program code means for transmitting, by a measurement application executing on a client computing device, a first message to a server;

computer readable program code means for initiating, by an initiation module executing on the server, a plurality of echo applications responsive to receiving the first message, wherein each echo application represents an application executing on the server;

computer readable program code means for generating, by a trigger module executing on the client computing device, an input event responsive to receiving end-user input for the application executing on the server;

computer readable program code means for transmitting, a transceiver module executing on the client computing device, the input event to the application executing on the server;

computer readable program code means for performing, by at least one echo application of the plurality of echo applications, a pre-determined task responsive to receiving the input event generated by the trigger module;

computer readable program code means for generating, by the at least one echo application of the plurality of echo applications, upon completion of the pre-determined task, a second message comprising instructions to modify a display of the client computing device;

computer readable program code means for receiving, by the measurement application, the second message;

computer readable program code means for modifying, by the measurement application, the display of the client computing device responsive to receiving the second message from the server; and computer readable program code means for determining, by the measurement application, an end-user experience metric using an amount of time measured between transmission of the first message and the execution of the modification instructions of the second message by the measurement application.

50. The article of manufacture of claim 49 further comprising computer readable program code means for determining an amount of time elapsed between when the measurement application generates and transmits the first message.

51. The article of manufacture of claim 49 further comprising computer readable program code means for determining an amount of time elapsed between when the measurement application receives the second message and detects a modification of the display of the client.

52. The article of manufacture of claim 49 further comprising computer readable program code means for determining an amount of time elapsed between when the server receives the first message and transmits the second message.

53. The article of manufacture of claim 49 further comprising computer readable program code means for determining at least one amount of time elapsed between two modules executing on the server.

54. The article of manufacture of claim 49 further comprising computer readable program code means for starting a timer executing on the client when the first message is transmitted and stop the timer at the conclusion of the execution of the modification instructions by the second message.

55. The article of manufacture of claim 49 wherein the at least one echo application executing on the server comprises a windowless application.

56. The article of manufacture of claim 55 further comprising computer readable program code means for automatically initiating the plurality of echo applications when the end-user of the client initiates another application.

57. The article of manufacture of claim 49 wherein the computer readable program code means for transmitting the first message includes instruction to transmit the first message when the end-user of the client performs a specified task.

58. The article of manufacture of claim 49 further comprising computer readable program code means for generating an input event by the server when the server receives the first message from the client and forward the input event to the at least one echo application.

59. The article of manufacture of claim 58 further comprising computer readable program code means for generating the second message when the at least one echo application processes the input event.

60. The article of manufacture of claim 58 further comprising computer readable program code means for generating the second message when the at least one echo application processes the input event and at least one execution task.

61. The article of manufacture of claim 49 wherein a modification to the display of the client is undetectable by the end-user of the client machine.

62. The article of manufacture of claim 49 wherein the second message comprises computer readable program code means for a small number of pixels on the display of the client.

63. The article of manufacture of claim 49 wherein the second message comprises computer readable program code means for changing a single pixel on the display of the client.

64. The article of manufacture of claim 49 wherein the second message comprises computer readable program code means for cycling a pixel on the display of the client through a range of values.

65. The article of manufacture of claim 49 wherein the second message comprises computer readable program code means for cycling a pixel change location on the display of the client through a range of locations.

66. The article of manufacture of claim 49 further comprising computer readable program code means for transmitting the elapsed time from the client to another computing element for use by the another computing element.

67. The article of manufacture of claim 66 further comprising computer readable program code means for comparing, by the another computing element, the elapsed time to an expected elapsed time.

68. The article of manufacture of claim 49 further comprising computer readable program code means for repeating the method at a periodic interval.

69. The article of manufacture of claim 68 further comprising computer readable program code means for transmitting each elapsed time measurement to another computing element that calculates an expected value for the elapsed time measurement.

70. The article of manufacture of claim 69 further comprising computer readable program code means for comparing a current elapsed time measurement to the expected elapsed time measurement.

71. The article of manufacture of claim 49 further comprising computer readable program code means for executing the at least one echo application in the same environment and at the same time as other applications on the server.

72. The article of manufacture of claim 49 further comprising computer readable program code means for executing the at least one echo applications at the server for each client of a server based computing environment, each echo application executing in a user space established by the server.

* * * * *